(12) United States Patent  (10) Patent No.: US 7,920,886 B1
Lai et al.  (45) Date of Patent: Apr. 5, 2011

(54) SYSTEMS AND METHODS FOR FACILITATING DISPATCH COMMUNICATIONS

(75) Inventors: Duc Dinh Lai, Chantilly, VA (US); Julio Palacio, Alpharetta, GA (US)

(73) Assignee: Nextel Communications, Inc., Reston, VA (US)

( * ) Notice: Subject to any disclaimer, the term of this patent is extended or adjusted under 35 U.S.C. 154(b) by 955 days.

(21) Appl. No.: 11/337,673

(22) Filed: Jan. 24, 2006

(51) Int. Cl.
*H04B 7/00* (2006.01)
(52) U.S. Cl. ........ 455/518; 455/519; 455/520; 455/90.2
(58) Field of Classification Search .................. 455/90.2, 455/412.1, 414.1, 518–520, 416; 370/352, 370/389, 338, 328
See application file for complete search history.

(56) References Cited

U.S. PATENT DOCUMENTS

| | | | | |
|---|---|---|---|---|
| 7,277,720 | B2 * | 10/2007 | Lazaridis | 455/517 |
| 7,533,342 | B1 * | 5/2009 | Vialle et al. | 715/717 |
| 7,536,195 | B2 * | 5/2009 | Yoon et al. | 455/518 |
| 2001/0026446 | A1 * | 10/2001 | Yoshida | 362/109 |
| 2004/0249949 | A1 * | 12/2004 | Gourraud et al. | 709/227 |
| 2004/0266418 | A1 * | 12/2004 | Kotzin | 455/420 |
| 2005/0143135 | A1 * | 6/2005 | Brems et al. | 455/564 |
| 2005/0164682 | A1 * | 7/2005 | Jenkins et al. | 455/412.1 |
| 2006/0052127 | A1 * | 3/2006 | Wolter | 455/519 |
| 2006/0211385 | A1 * | 9/2006 | Kayzar et al. | 455/90.3 |

* cited by examiner

*Primary Examiner* — Dominic E Rego

(57) ABSTRACT

Systems and methods for facilitating dispatch communications are provided. Buttons related to dispatch communications can be displayed when dispatch call addresses are received by a mobile station. Additionally, selection menus with options related to dispatch communications can be displayed in a call history display when a dispatch communication is selected. When a contact with a dispatch communication address is selected, a selection menu with options related to dispatch communications can be displayed.

15 Claims, 12 Drawing Sheets

| | | |
|---|---|---|
| Call History | | ☒ |
| 📞 | (604) 555-1212 | 10:19 am |
| 📞 | (604) 555-1414 | 10:20 am |
| 📱 | 164*100*12345 | 10:21 am |
| 📱 | 164*100*12454 | Save to Contacts<br>View Note<br>Delete<br>Send Text Message<br>Call<br>Alert<br>Dispatch Call |
| 📱 | #42 | |
| Call | | Menu |

Figure 5b

SYSTEMS AND METHODS FOR FACILITATING DISPATCH COMMUNICATIONS

BACKGROUND OF THE INVENTION

Wireless communications systems typically provide interconnect and/or dispatch voice communication services. Interconnect voice communication services are those typically provided by most wireless carriers as circuit-switched communications. Dispatch communication services are commonly known as walkie-talkie or push-to-talk (PTT) types of calls, such as Sprint Nextel Corporation's service identified by the trade name Direct Connect. Only recently have many wireless network operators realized the potential of dispatch communications. For many years only one type of network, the iDEN network, has provided both dispatch and interconnect voice communications services. Due to the increased popularity of dispatch communication services, more handsets are now being designed to support both dispatch and interconnect communication services. Accordingly, it would be desirable to provide systems and methods for handsets that facilitate the selection and manipulation of information related to dispatch communication services.

SUMMARY OF THE INVENTION

Exemplary embodiments of the present invention provide systems and methods for facilitating dispatch communications. In accordance with one aspect of the present invention, digits input into a communications dialer are analyzed to determine whether they correspond to a dispatch communication. When the digits correspond to a dispatch private call, a dispatch call alert button is displayed on the dialer. When the digits correspond to a dispatch group call, a dispatch group call join is displayed on the dialer.

In accordance with another aspect of the present invention, systems and methods for facilitating dispatch communications using contact information are provided. When a contact is selected, it is determined whether the contact includes a dispatch communication address. When the contact includes a dispatch communication address, a dispatch communication selection menu is displayed.

In accordance with yet another aspect of the present invention, systems and methods for facilitating dispatch communications using call history information are provided. When an entry in a communication call history is selected, it is determined whether the selected entry corresponds to a communication with a dispatch communication address. When the selected entry corresponds to a communication with a dispatch communication address, a dispatch communication selection menu is displayed.

Other objects, advantages and novel features of the present invention will become apparent from the following detailed description of the invention when considered in conjunction with the accompanying drawings.

BRIEF DESCRIPTION OF THE DRAWING FIGURES

FIGS. 5a-5c illustrate exemplary call history screens in accordance with the present invention.

DETAILED DESCRIPTION OF THE PREFERRED EMBODIMENTS

Figure 1A:
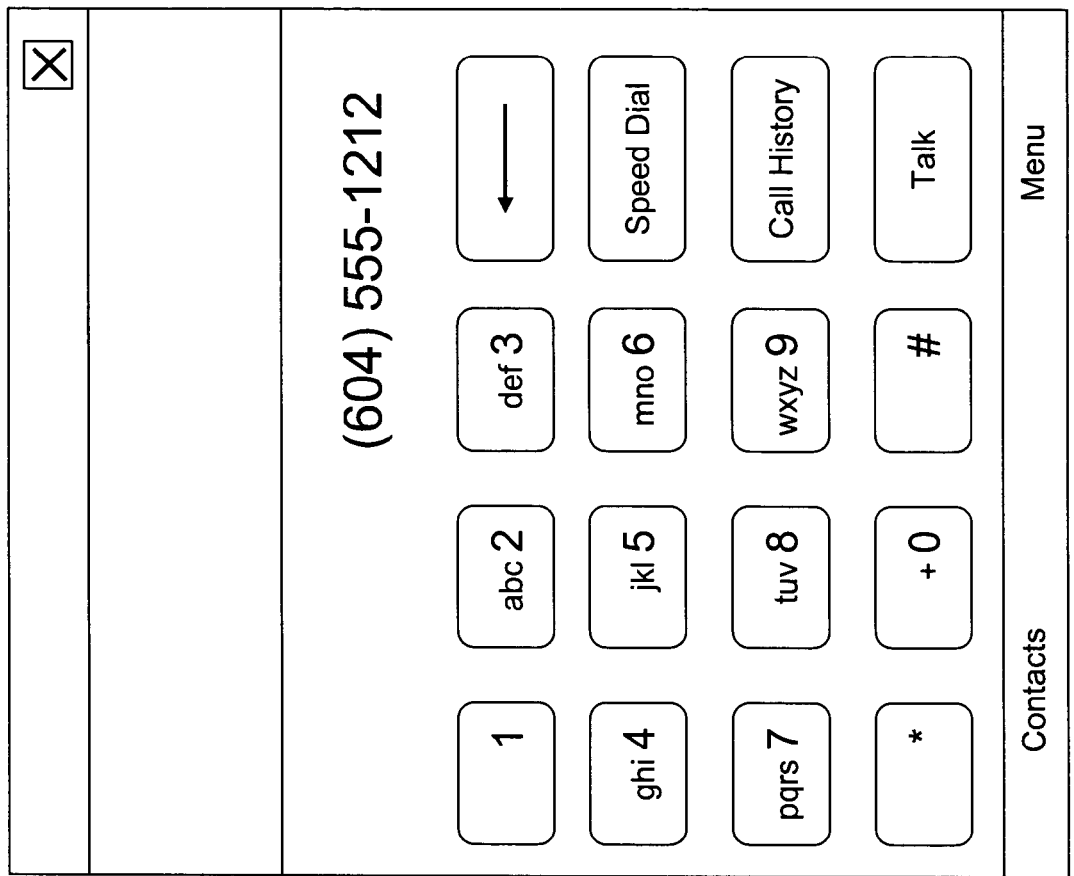
FIGS. 1a-1c illustrate exemplary communications dialers in accordance with the present invention.

FIG. 1a illustrates an exemplary communications dialer. The dialer can be implemented on a mobile or fixed station in the form of a graphical user interface (GUI). For example, the dialer can be implemented on a Windows Mobile 5.0 operating system. The communications dialer includes a plurality of number buttons, an enter button (with an arrow designator), speed dial button, call history button, talk button, a contact button and menu button. The number buttons are used for entering calling addresses. The speed dial, call history, contact and menu buttons are used for accessing the respective screens. The enter and talk buttons are used for initiating interconnect communications. Actuation of the buttons can be performed using a point-and-click interface or a touch screen interface. The dialer also includes an information display portion, above the buttons, which is used to display information about an ongoing call.

Figure 1B:
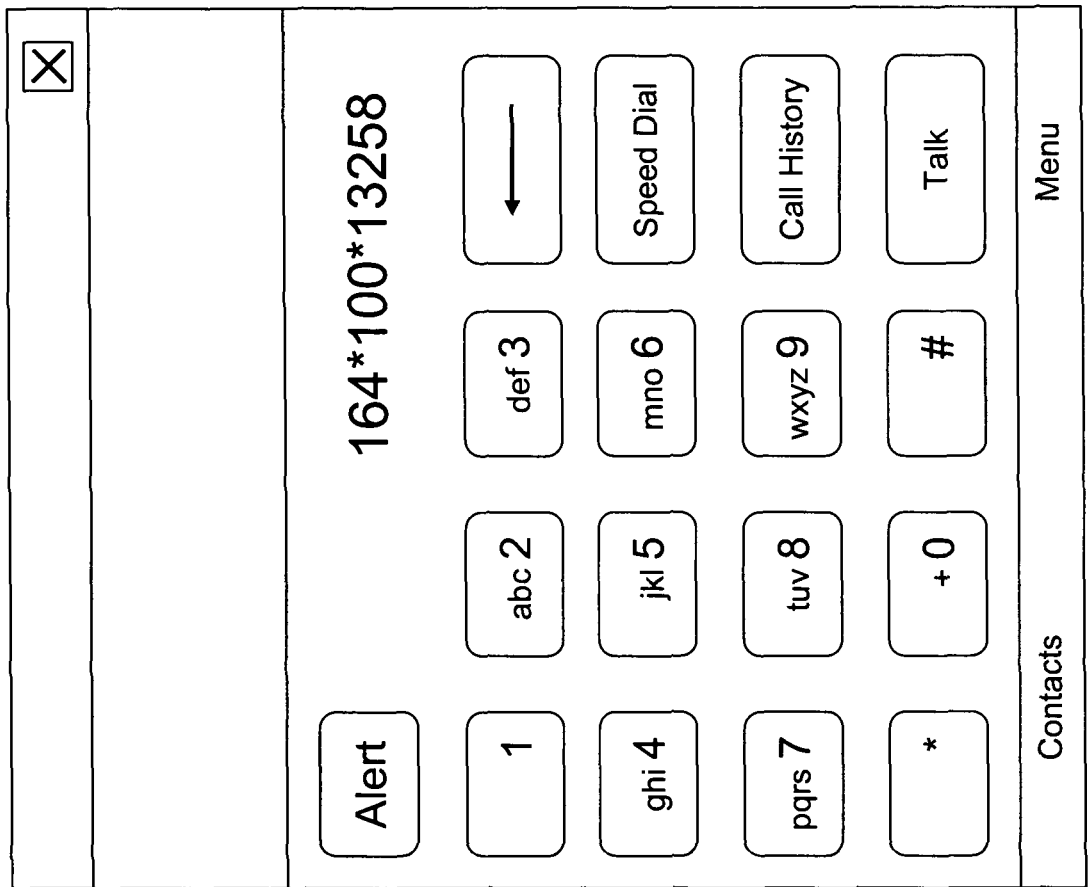
Figure 1C:
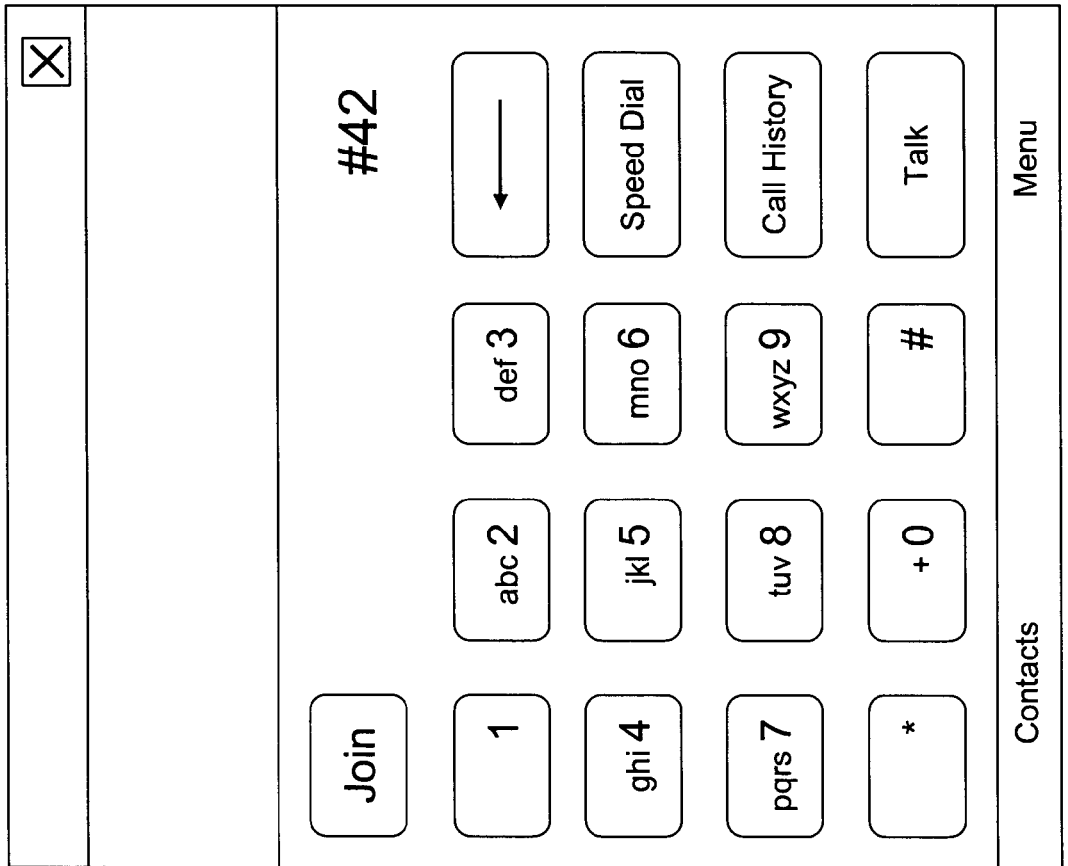

In the dialer illustrated in FIG. 1a an interconnect telephone number has been entered. FIGS. 1b and 1c illustrate exemplary communications dialers in accordance with the present invention. As illustrated in FIGS. 1b and 1c, dispatch communication addresses, such as private call or group call addresses, have been entered. As illustrated in FIG. 1b, when a private call address is entered, an alert button is displayed on the dialer. Actuation of the alert button allows for a dispatch call alert to be sent to the entered dispatch communication address. As illustrated in FIG. 1c, when a group call address is entered, a join button is displayed on the dialer. A dispatch group call join is similar to a private call alert, except that it is sent to a number of dispatch stations, whereas a private call alert is sent to a single dispatch station. Actuation of the join button allows for a dispatch group call join message to be sent to each member of the dispatch talk group. As illustrated in FIGS. 1b and 1c, the alert and join buttons are located in the same line with the dialed number, above the buttons and below the information display portion. The alert and join buttons can be displayed in a different manner from the other buttons. For example, the alert and join buttons can be yellow and the other buttons can be blue.

Figure 2:
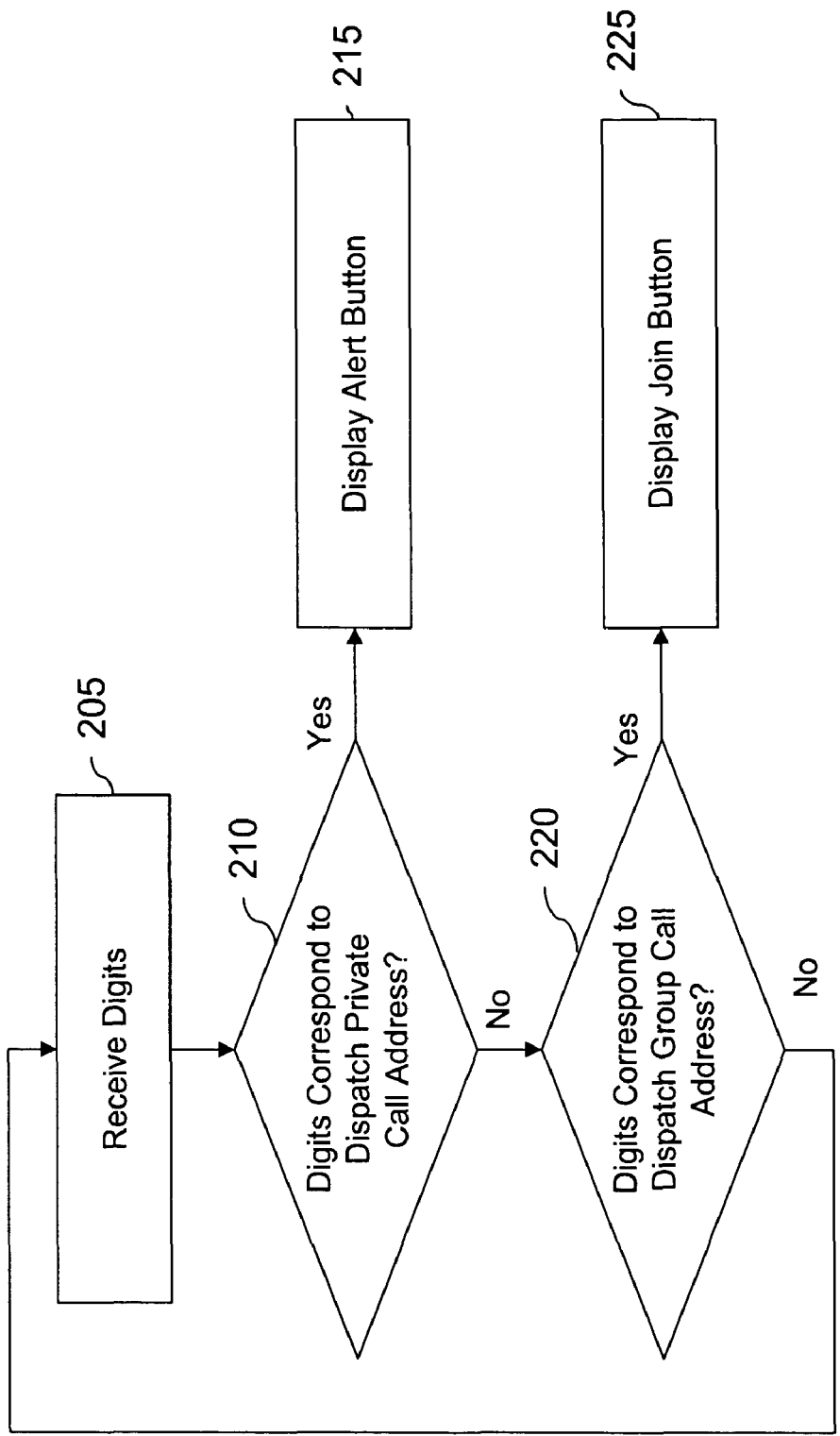
FIG. 2 illustrates an exemplary method for displaying a dialer in accordance with the present invention.

FIG. 2 illustrates an exemplary method for displaying a dialer in accordance with the present invention. As the mobile station receives digits (step 205), the mobile station determines whether the digits correspond to a dispatch private call or group call address (steps 210 and 220). When the digits correspond to a dispatch private call address ("Yes" path out of decision step 210), then the alert button is displayed on the dialer (step 215). When the digits correspond to a dispatch group call address ("Yes" path out of decision step 220), then the join button is displayed on the dialer (step 225).

Figure 3A:
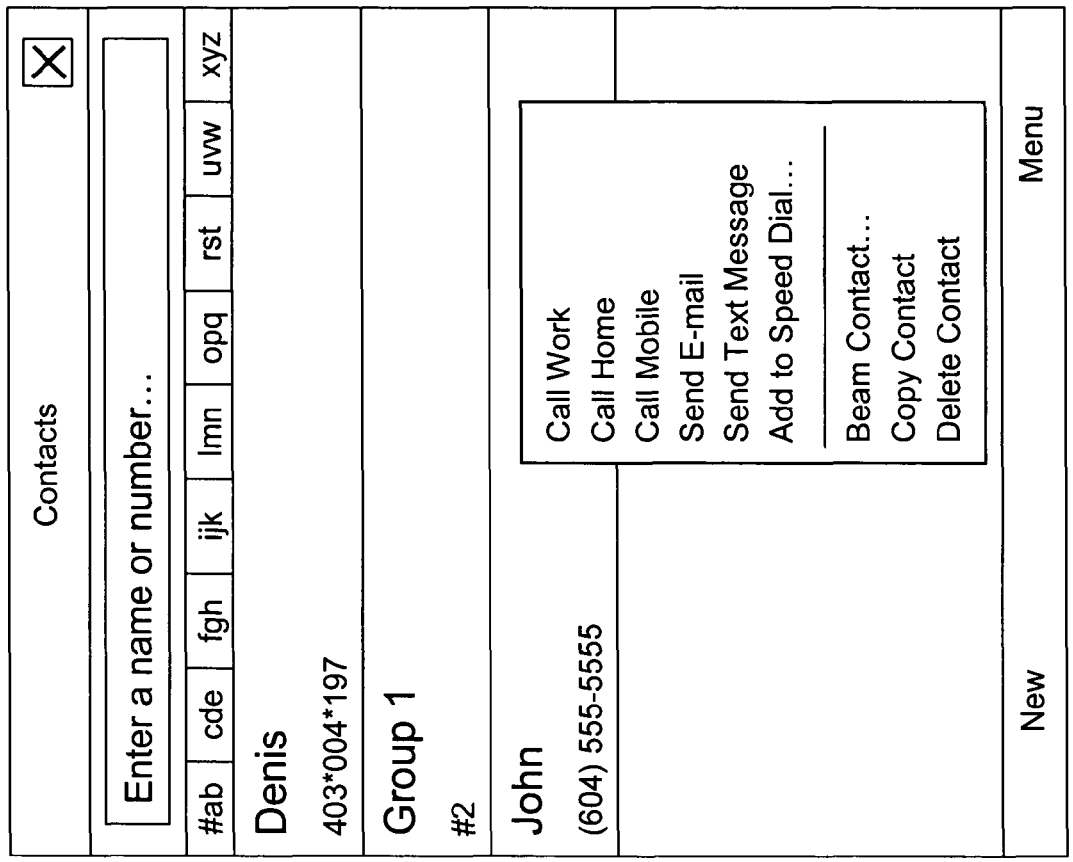
FIGS. 3a-3c illustrate exemplary contacts screens in accordance with the present invention.
Figure 3B:
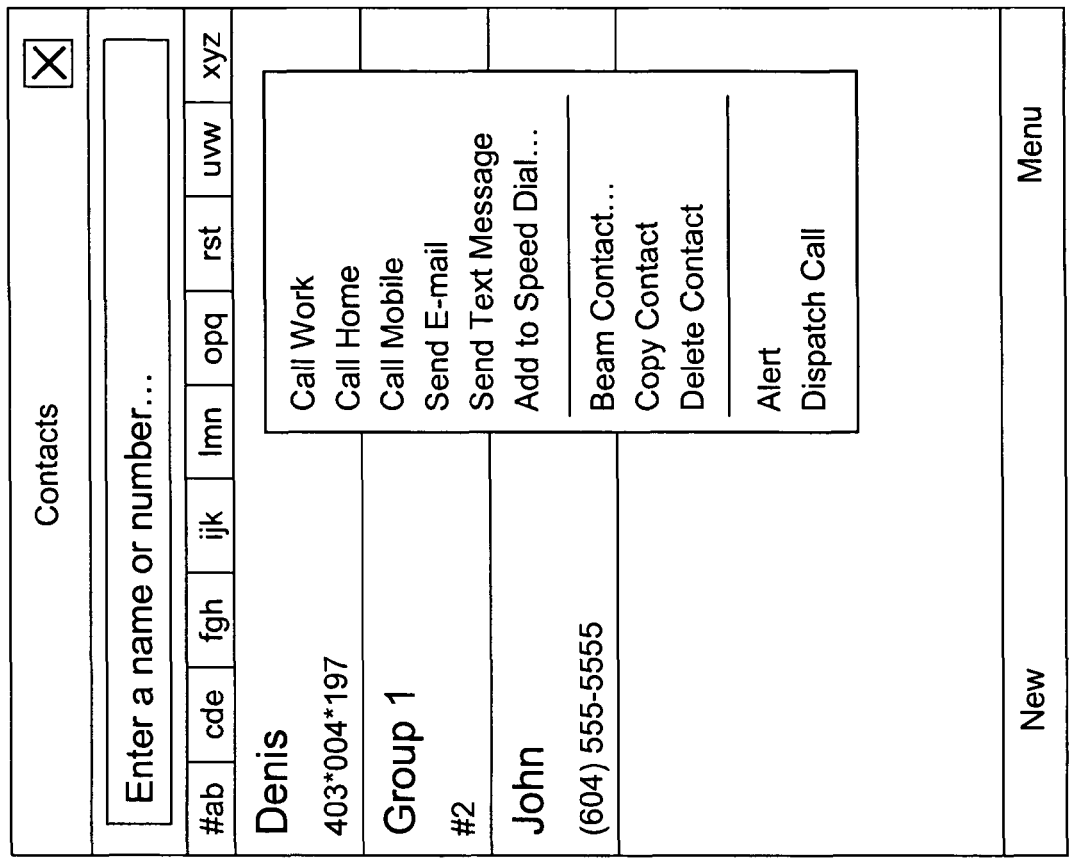
Figure 3C:
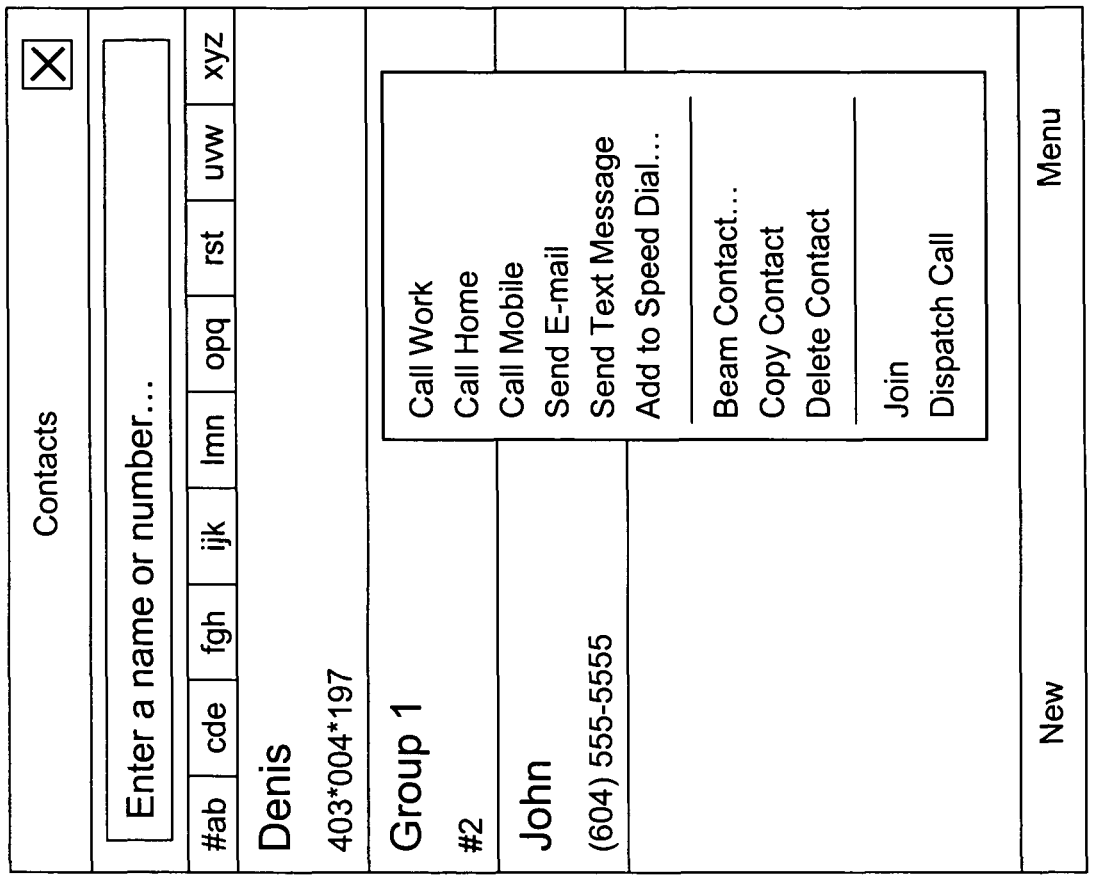

FIGS. 3a-3c illustrate exemplary contacts screens in accordance with exemplary embodiments of the present invention. The illustrated contacts screens include a contact with a dispatch private call address (Denis), a contact with a dispatch group call address (Group 1), and a contact with an interconnect call address (John). As illustrated in FIG. 3a, when a contact with only an interconnect call address is selected, a selection menu is displayed. A contact can be selected by a point-and-click interface or a touch screen interface. In either case, the selection menu can be displayed in response to a touch and hold operation, in which the selection menu is only displayed after the entry has been selected for a predetermined amount of time. The selection menu includes a number of options related to the contact. Those options that are not relevant to the particular contact can be displayed in a different manner than those options that are relevant to the particular contact. For example, assuming that the contact John does not have a stored e-mail address, the "Send E-mail" option will be displayed in a different manner than the other options.

FIGS. 3b and 3c illustrate exemplary contacts screens for contacts selected that include dispatch communication addresses. As illustrated in FIGS. 3b and 3c, when a contact is selected that includes a dispatch communication address, a dispatch communication selection menu is displayed. In FIG. 3b the contact includes a dispatch private call address, and accordingly, the dispatch communication selection menu includes options for a dispatch call alert and a dispatch call. In FIG. 3c the contact includes a dispatch group call address, and the dispatch communication selection menu includes options for a dispatch group call join and a dispatch group call. Although not illustrated in FIGS. 3a-3c, a contact may have an associated dispatch communication address that is not displayed in the illustrated contact screen. In this case, the dispatch communication selection menu would still be displayed when the contact is selected.

Figure 4:
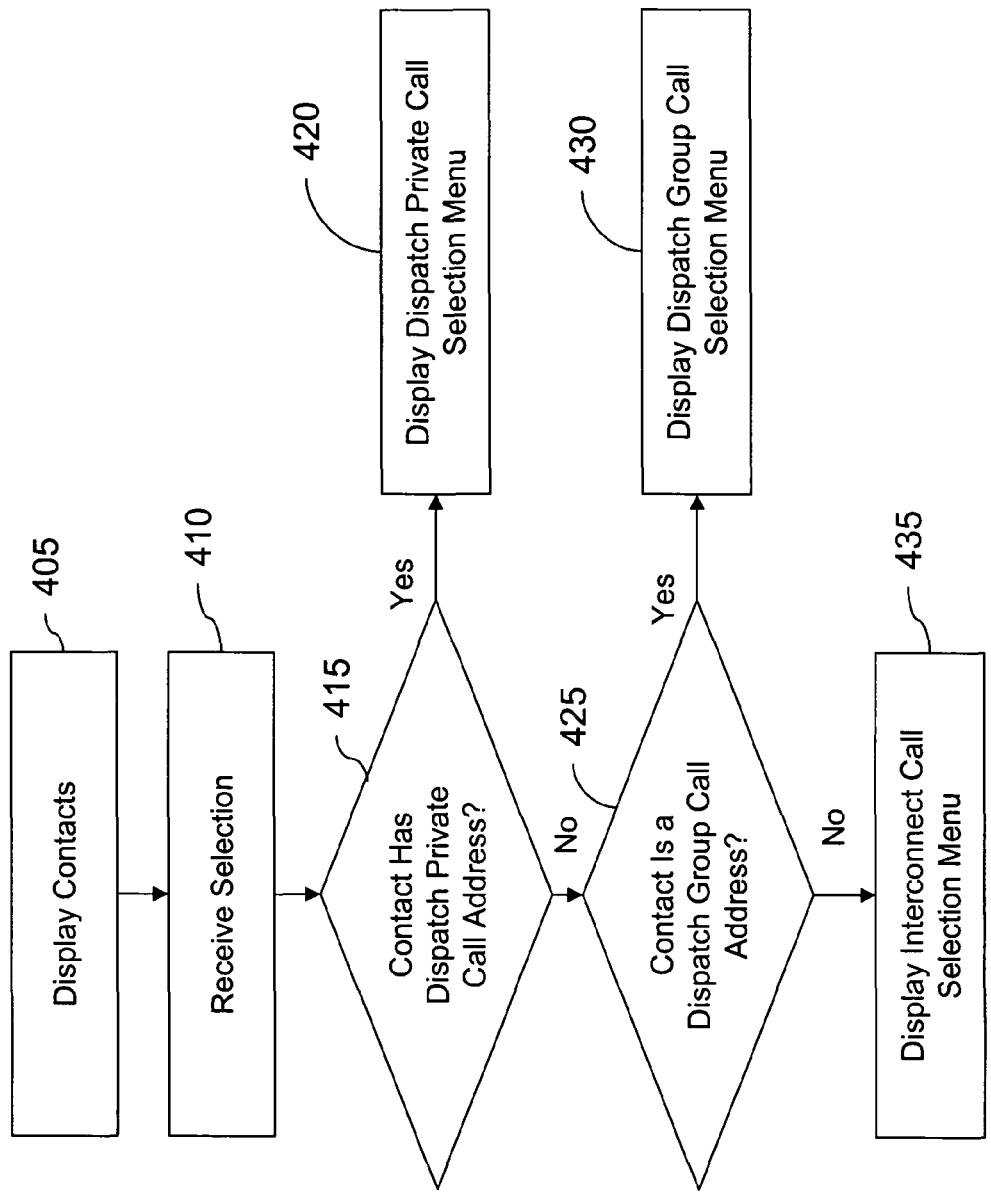
FIG. 4 illustrates an exemplary method for displaying a contacts screen in accordance with the present invention.

FIG. 4 illustrates an exemplary method for displaying a contacts screen in accordance with the present invention. When the contacts are displayed and a contact is selected (steps 405 and 410), it is determined whether the contact has a dispatch private call address (step 415). When the contact has a dispatch private call address ("Yes" path out of decision step 415), then the dispatch private call selection menu is displayed (step 420). When the contact is a dispatch group call address ("Yes" path out of decision step 425), then the dispatch group call selection menu is displayed (step 430). When the contact does not have any dispatch communication addresses associated with it ("No" path out of decision step 425), then the interconnect call selection menu is displayed (step 435).

Figure 5A:
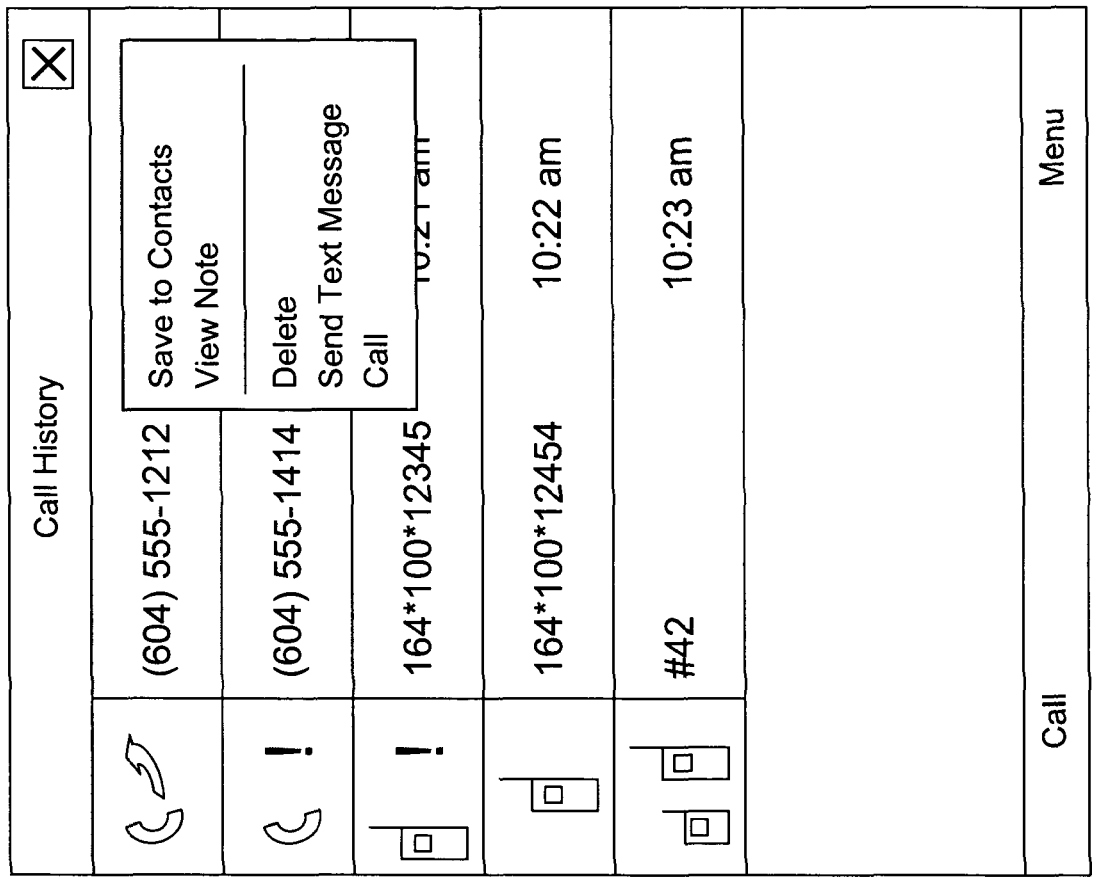
Figure 5C:

FIGS. 5a-5c illustrate exemplary call history screens in accordance with the present invention. As illustrated in FIGS. 5a-5c, each entry in the call history includes a identifier, such as an icon, associated with the particular call type. In FIGS. 5a-5c an outgoing interconnect call is identified by a telephone and an arrow, a missed incoming interconnect call is identified by a telephone and an exclamation point, a dispatch call alert is identified by a mobile telephone and an exclamation point, a dispatch private call is identified by a mobile telephone, and a dispatch group call is identified by two mobile telephones. If any of the dispatch calls are missed incoming calls, an additional identifier can be provided.

FIG. 5a illustrates an exemplary call history screen when an interconnect call entry is selected. Selection of entries in a call history can be performed in a similar manner to that described above in connection with the contacts. As illustrated in FIG. 5a, when an interconnect call is selected in the call history, a communication selection menu is displayed, including options related to an interconnect call. As illustrated in FIGS. 5b and 5c, when a dispatch call is selected, a communication selection menu is displayed, including options related to a dispatch call. For example, in FIG. 5b a dispatch private call is selected and the selection menu includes dispatch call alert and dispatch call options, and as illustrated in FIG. 5c a dispatch group call is selected and the selection menu includes dispatch talk group join and dispatch call options.

Figure 6:
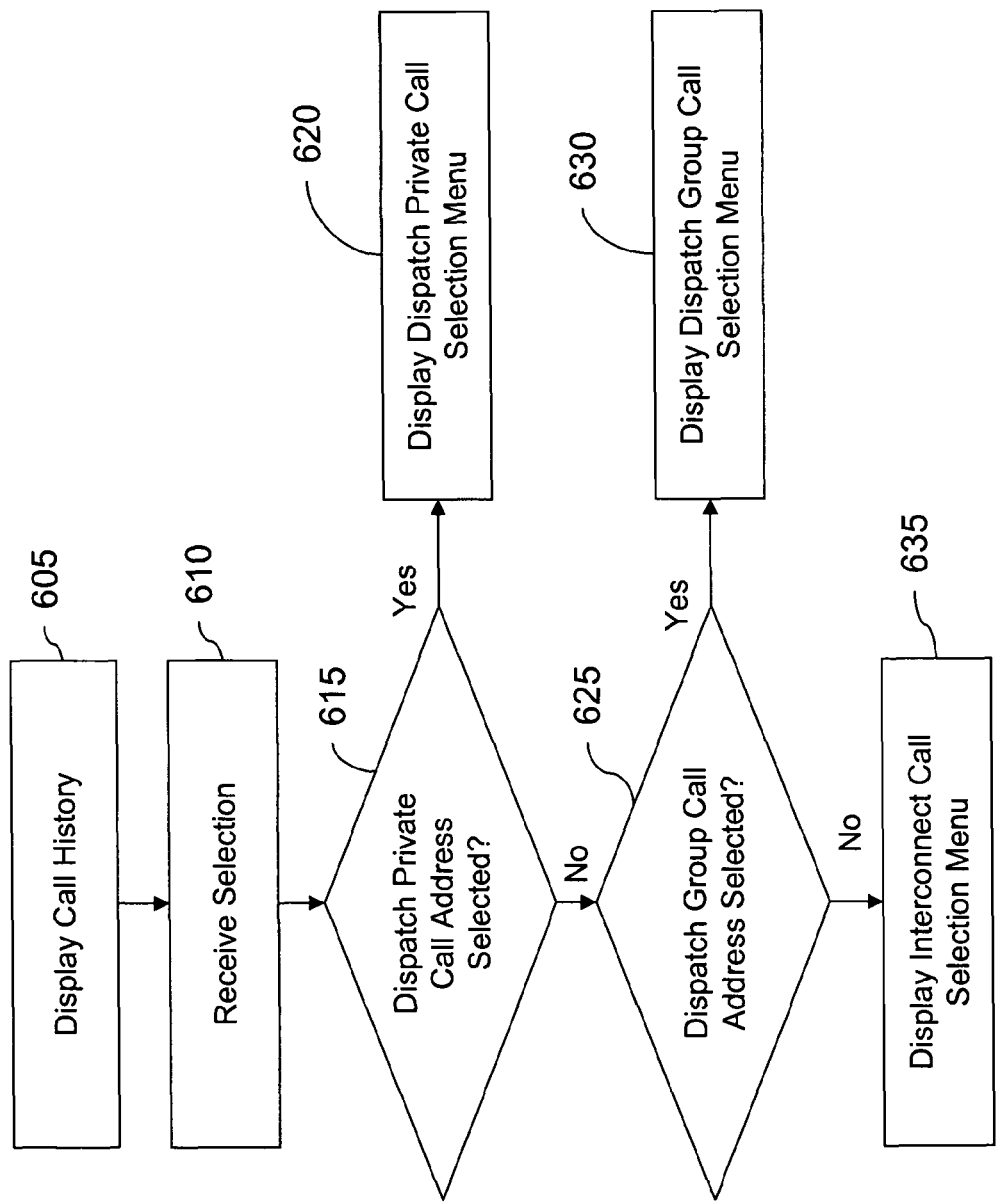
FIG. 6 illustrates an exemplary method for displaying a call history screen in accordance with the present invention.

FIG. 6 illustrates an exemplary method for displaying a call history screen in accordance with the present invention. When the call history is displayed and a selection is received (steps 605 and 610), it is determined whether the selection is a dispatch private call address (step 615). When the selection is a dispatch private call address ("Yes" path out of decision step 615), then the dispatch private call menu is displayed (step 620). When the selection is a dispatch group call ("Yes" path out of decision step 625), then the dispatch group call menu is displayed (step 630). When the selection is an interconnect call ("No" path out of decision step 625), then the interconnect call menu is displayed (step 635).

Although the various methods described above in connection with FIGS. 2, 4 and 6 have been described separately, these methods can be performed in a single method, depending upon which screen is currently displayed. These methods can be performed by a processor executing code received from a computer-readable medium, an application specific integrated circuit (ASIC), field programmable gate array (FPGA) and/or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying a communications dialer, the method comprising the acts of:
   receiving digits;
   determining that the digits correspond to a dispatch communication address by analyzing the digits;
   displaying the dispatch communication address; and
   displaying a dispatch communication button on the communications dialer in response to the determination,
   wherein, when the digits correspond to a dispatch private call address, the displayed dispatch communication button is a dispatch alert button that initiates a dispatch private call when pressed, and when the digits correspond to a dispatch group call address, the displayed dispatch communication button is a dispatch group call join button that initiates a dispatch group call when pressed.

2. The method of claim 1, wherein the dispatch communications button is displayed in a different color from other buttons of the communications dialer.

3. The method of claim 1, wherein the dispatch communication button is displayed on the communications dialer at a same height as the dispatch communication address.

4. The method of claim 1, further comprising the act of displaying a contact selection menu for the dispatch communication address in response to receiving a selection input for a predetermined amount of time.

5. A method for displaying dispatch communication information, the method comprising the acts of:
   receiving a selection;
   determining whether the received selection corresponds to an entry with a dispatch communication address; and
   displaying a dispatch communication selection menu in response to a determination that the received selection corresponds to the dispatch communications address,
   wherein the dispatch communication selection menu includes an option to initiate a dispatch communications call, and the dispatch communications call is initiated by selecting the option in the dispatch communication selection menu.

6. The method of claim 5, wherein the entry is in a contacts list.

7. The method of claim 6, wherein the dispatch communication address is a dispatch private call address and the dispatch communication selection menu further includes an alert option.

8. The method of claim 6, wherein the dispatch communication address is a dispatch group call address and the option to initiate the dispatch communication call is a group join option.

9. The method of claim 6, wherein the contact includes an interconnect communication address and the dispatch communication selection menu includes an interconnect communication initiation option.

10. The method of claim 6, wherein the contact does not include an interconnect communication address and the dispatch communication selection menu includes an interconnect communication initiation option displayed in a different manner from dispatch communication options.

11. The method of claim 5, wherein the entry is in a call history list.

12. The method of claim 11, wherein the dispatch communication address is a dispatch private call address and the dispatch communication selection menu includes an alert option.

13. The method of claim 11, wherein the dispatch communication address is a dispatch group call address and the dispatch communication selection menu includes a group join option.

14. The method of claim 11, wherein the communication is an outgoing communication.

15. The method of claim 11, wherein the communication is an incoming communication.

* * * * *